(12) United States Patent
Hayami

(10) Patent No.: US 8,913,288 B2
(45) Date of Patent: Dec. 16, 2014

(54) METHOD AND SYSTEM FOR CHANGING PHYSICAL PAGE PROPERTIES IN A PRITING APPLICATION

(75) Inventor: Isao Hayami, Yokohama (JP)

(73) Assignee: Konica Minolta Laboratory U.S.A., Inc., San Mateo, CA (US)

( * ) Notice: Subject to any disclaimer, the term of this patent is extended or adjusted under 35 U.S.C. 154(b) by 68 days.

(21) Appl. No.: 13/436,186

(22) Filed: Mar. 30, 2012

(65) Prior Publication Data

US 2013/0258362 A1    Oct. 3, 2013

(51) Int. Cl.
*G06F 15/00* (2006.01)

(52) U.S. Cl.
USPC ............ 358/1.9; 358/2.1; 358/1.18; 382/282; 382/284; 715/202; 715/204; 715/243; 715/246; 715/251

(58) Field of Classification Search
CPC ..... G06F 3/1244; G06F 3/1242; G06F 3/125; H04N 1/3876; H04N 1/4052; H04N 1/0044
USPC .......... 358/1.9, 1.2, 1.6, 2.1, 1.13, 1.15, 1.18, 358/540, 538; 382/282, 284, 298; 715/202, 715/204, 243, 246, 251
See application file for complete search history.

(56) References Cited

U.S. PATENT DOCUMENTS

| | | | | |
|---|---|---|---|---|
| 5,508,718 A * | 4/1996 | Haikin | .......................... | 345/601 |
| 6,556,210 B1 * | 4/2003 | Yamamoto et al. | ........... | 345/582 |
| 6,724,946 B1 * | 4/2004 | Kusama et al. | ............... | 382/284 |
| 7,050,194 B1 * | 5/2006 | Someno et al. | ................ | 358/1.9 |
| 2005/0052662 A1 * | 3/2005 | Nishikawa et al. | ............ | 358/1.2 |
| 2008/0144135 A1 * | 6/2008 | Miers | ............................ | 358/500 |
| 2009/0185209 A1 * | 7/2009 | Yudasaka et al. | .............. | 358/1.9 |

\* cited by examiner

*Primary Examiner* — Jamares Q Washington
(74) *Attorney, Agent, or Firm* — Buchanan Ingersoll & Rooney PC

(57) ABSTRACT

A method for changing physical page properties in a large format printing application on a client device, the client device having executable instructions for creating a print job for producing a printout of an image. The steps include selecting the image for the print job; selecting a logical page size for the printout of the image; dividing the logical page size into a plurality of physical pages based on a selected medium; selecting at least one physical page from the plurality of physical pages and changing at least one print property on the at least one physical page; and adjusting the at least one print property on adjacent physical pages to the selected at least one physical page to avoid a sudden change in image quality and/or image appearance of the image in the printout.

19 Claims, 5 Drawing Sheets

METHOD AND SYSTEM FOR CHANGING PHYSICAL PAGE PROPERTIES IN A PRITING APPLICATION

FIELD OF THE INVENTION

This invention relates to printing of large format printouts or poster printing, and in particular, it relates to a network printing system and method of creating a print job, wherein the user can specify a print property for one or more individual physical pages, which is different than from other physical pages in the print job and adjusting the print property in neighboring physical pages, which form poster pages, flip books and the like.

BACKGROUND OF THE INVENTION

Poster printing refers to large format printing where the printouts have sizes many times larger than a letter or A4 sized sheet. For example, a poster may be 24 inches by 36 inches in size. In addition, high quality printouts are desired for poster printing. Conventionally, posters are printed on large format papers and require sophisticated, large printers to print. Small printers typically used in homes or business offices, are typically limited to letter, legal, A4 and A3 sizes papers and cannot handle larger sized papers.

To enable printing of a large format poster using a small printer in an inexpensive manner, some printer drivers or application software provide a poster printing function, which divides the large poster image into smaller image sections, typically rectangular in shape. For example, a 24 inch by 36 inch poster can be divided into 2 by 3 image sections or partitions to be printed. The image sections or partitions are printed separately on individual sheets of paper, and assembled together by the user to form a large format poster.

Alternatively, a flip book is a stack of consecutive sheets containing a series of images bound together along one edge wherein each sheet contains an image with a small incremental movement and/or change in print properties over the image preceding it in the stack. When the user flips through or otherwise rapidly moves through the series of images, the images appear to be in motion.

In accordance with an exemplary embodiment, it would be desirable to allow an individual user to specify a print property for an individual physical page that is different from other physical pages in the print job, and adjusting the print properties on adjacent or neighboring physical pages to avoid a sudden change in image quality and/or image appearance of the image in the printout. For example, the user can change the color and/or image quality of one or more of the physical pages within the logical page size for a poster page.

SUMMARY OF THE INVENTION

In consideration of the above issues, it would be desirable to have a system and method, which provides a user with the ability to select at least one physical page from a plurality of pages and change at least one print properties on the at least one physical page, which is different than other physical pages within the large format print job and also adjusts the at least one print property on adjacent physical pages to avoid a sudden change in image quality and/or image appearance of the image in the printout.

In accordance with an exemplary embodiment, a method for changing physical page properties in a large format printing application on a client device, the client device having executable instructions for creating a print job for producing a printout of an image, comprises: selecting the image for the print job; selecting a logical page size for the printout of the image; dividing the logical page size into a plurality of physical pages based on a selected medium; selecting at least one physical page from the plurality of physical pages and changing at least one print property on the at least one physical page; and adjusting the at least one print property on adjacent physical pages to the selected at least one physical page to avoid a sudden change in image quality and/or image appearance of the image in the printout.

In accordance with another exemplary embodiment, a printing system for changing physical page properties in a large format printing application, comprises: an image forming apparatus; a client device having executable instructions for creating a print job for producing a printout of an image, comprising: selecting an image for a print job; selecting the image for the print job; selecting a logical page size for the printout of the image; dividing the logical page size into a plurality of physical pages based on a selected medium; selecting at least one physical page from the plurality of physical pages and changing at least one print property on the at least one physical page; and adjusting the at least one print property on adjacent physical pages to the selected at least one physical page to avoid a sudden change in image quality and/or image appearance of the image in the printout; and wherein the image forming apparatus and the client device are connected.

In accordance with a further exemplary embodiment, a non-transitory computer readable medium containing a computer program for creating a print job, wherein the computer program comprises executable instructions for: selecting the image for the print job; selecting a logical page size for the printout of the image; dividing the logical page size into a plurality of physical pages based on a selected medium; selecting at least one physical page from the plurality of physical pages and changing at least one print property on the at least one physical page; and adjusting the at least one print property on adjacent physical pages to the selected at least one physical page to avoid a sudden change in image quality and/or image appearance of the image in the printout.

In accordance with another exemplary embodiment, a method for changing physical page properties in a printing application on a client device, the client device having executable instructions for creating a print job for producing a printout of an image on a plurality of consecutive physical pages, the method comprises: selecting the image for the print job; changing at least one print property on the image for at least one physical page; and adjusting the at least one print property on the plurality of consecutive physical pages following the at least one physical page to avoid a sudden change in image quality and/or image appearance of the image in each of the plurality of consecutive physical pages.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
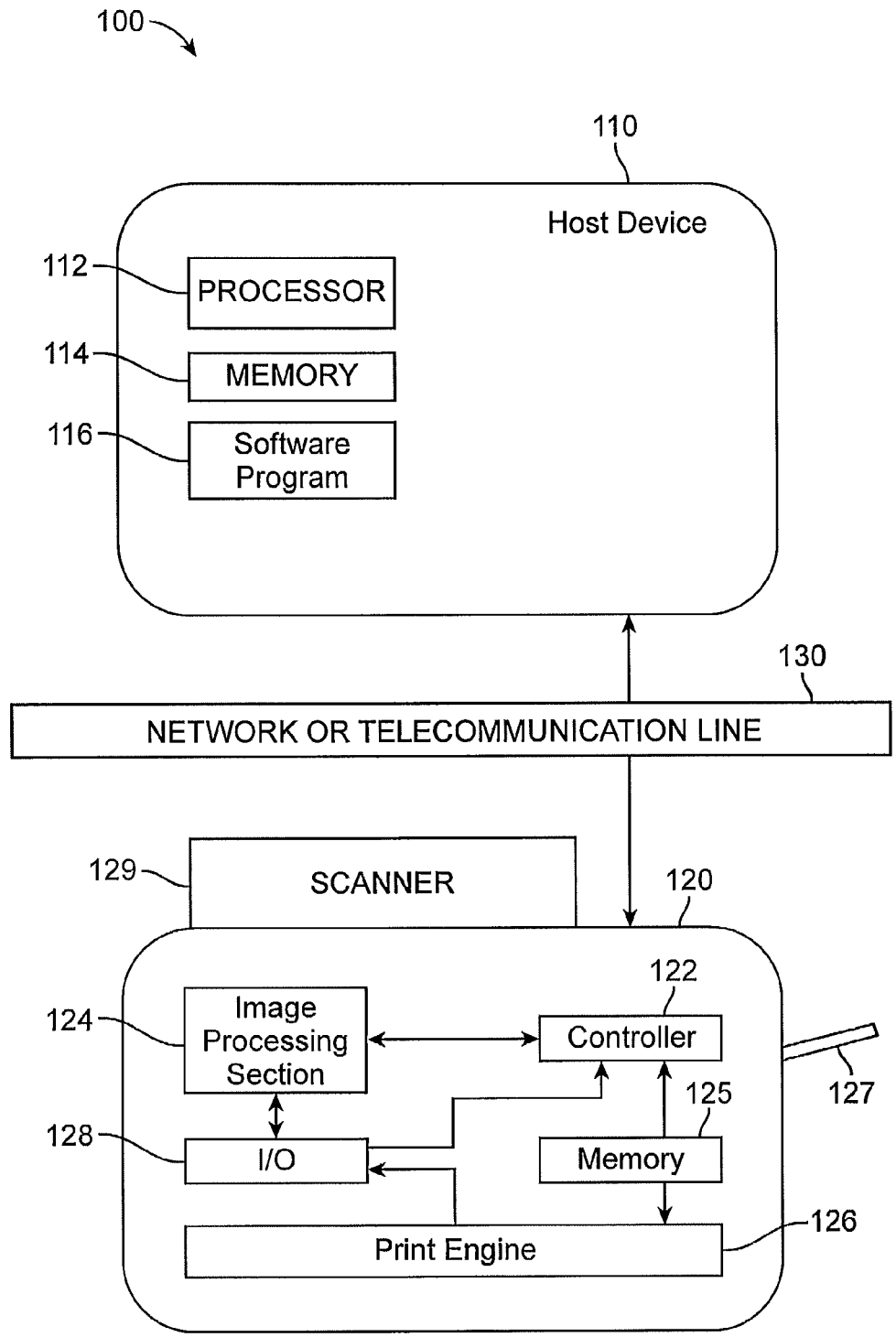
FIG. 1 is an illustration of data processing system, which includes a client device or host computer, and an image forming apparatus or printer connected to the client device in accordance with an exemplary embodiment.

Reference will now be made in detail to the present preferred embodiments of the invention, examples of which are illustrated in the accompanying drawings. Wherever possible, the same reference numbers are used in the drawings and the description to refer to the same or like parts.

Large image printing includes in most cases images having a size equal to or greater than a defined paper and/or medium size, and wherein at least one or more sheets of paper and/or medium are needed.

In accordance with an exemplary embodiment, the method and system described herein provides for changing physical page properties in a poster printing application on a client device and/or image forming apparatus. In accordance with an exemplary embodiment, the executable instructions for creating a print job for producing a printout of an image are hosted on a client device and/or an image forming apparatus. The executable instructions include the steps of: selecting the image for the print job; selecting a logical page size for the printout of the image; dividing the logical page size into a plurality of physical pages based on a selected medium; selecting at least one physical page from the plurality of physical pages and changing at least one print property on the at least one physical page; and adjusting the at least one print property on adjacent physical pages to the selected at least one physical page to avoid a sudden change in image quality and/or image appearance of the image in the printout.

FIG. 1 is an illustration of a data processing system 100, which includes a client device or host computer 110 and an image forming apparatus or printer 120 connected to the client device 110. The client device 110 preferably includes a processor or central processing unit (CPU) 112, one or more memories 114 for storing software programs 116 and data (such as files to be printed). The client device 110 also includes an operating system (OS), which manages the computer hardware and provides common services for efficient execution of various software programs 116. The processor or CPU 112 carries out the instructions of a computer program, which operates and/or controls at least a portion of the functionality of the client device 110. Examples of client devices 110 include and are not limited to personal computers, image forming apparatuses, routers, and/or personal digital assistants (PDAs).

The image forming apparatus 120 is preferably in the form of an industrial image forming apparatus, a multi-functional printer, and/or an all-in-one printer 120 connected to the client device 110. The client device 110 submits print jobs to the image forming apparatus (printer or printing device) 120 by transmitting data representing the documents to be printed and information describing the print job. The image forming apparatus (i.e., printer/printing device) 120 typically includes a printer controller (or controller) 122, an image processing section (or data dispatcher) 124, a memory section 125 preferably in the form of a hard disk drive (HDD), a print engine 126, a print tray 127, an input/output (I/O) section 128, and scanner 129.

The controller 122 typically includes a central processing unit (CPU), a random access memory (RAM), and a read only memory (ROM). The central processing unit is configured to execute a sequence of stored instructions (i.e., a computer program). The controller 122 also includes an operating system, which acts as an intermediary between the software programs and hardware components within the image forming apparatus 120. The operating system (or OS) manages the computer hardware and provides common services for efficient execution of application software. In accordance with an exemplary embodiment, the controller 122 processes the data and job information received from the client device 110 to generate a print image.

The image processing section 124 carries out image processing under the control of the controller 122, and sends the processed print image data to the print engine 126. The print engine 126 forms an image on a recording sheet based on the image data sent from the image processing section 124. The I/O section performs data transfer with the host computer 110. The controller 122 is programmed to process data and control various other components of the image forming apparatus or printer 120 to carry out the various methods described herein. The hard disk drive (HDD) or storage device stores digital data and/or software programs for recall by the controller 122. In accordance with an exemplary embodiment, the digital data includes resources, which can include graphics/images, logos, form overlays, fonts, etc.

The input/output (I/O) port 128 provides communications between the printer section and the client device 110 and receives page descriptions (or print data) from the host for processing within the image forming apparatus 120. In accordance with an exemplary embodiment, the operation of printer section commences when it receives a page description from the client device 110 via I/O port 128 in the form of a print job data stream. The page description may be any kind of page description languages (PDLs), such as PostScript® (PS), Printer Control Language (PCL), Portable Document Format (PDF), XML Paper Specification (XPS), and so on. Examples of image forming apparatuses 120 consistent with exemplary embodiments of the invention include industrial printers, and/or multi-function printers or peripherals (MFP).

The client device 110 and the image forming apparatus (or printer) 120 are preferably connected to one another via a network 130. Examples of the network 130 consistent with embodiments of the invention include, but are not limited to, the Internet, an intranet, a local area network (LAN) and a wide area network (WAN). The client device 110 and the image forming apparatus 120 can also be connected with a wire and/or wireless technology by using radio frequency (RF) and/or infrared (IR) transmission.

Figure 2:
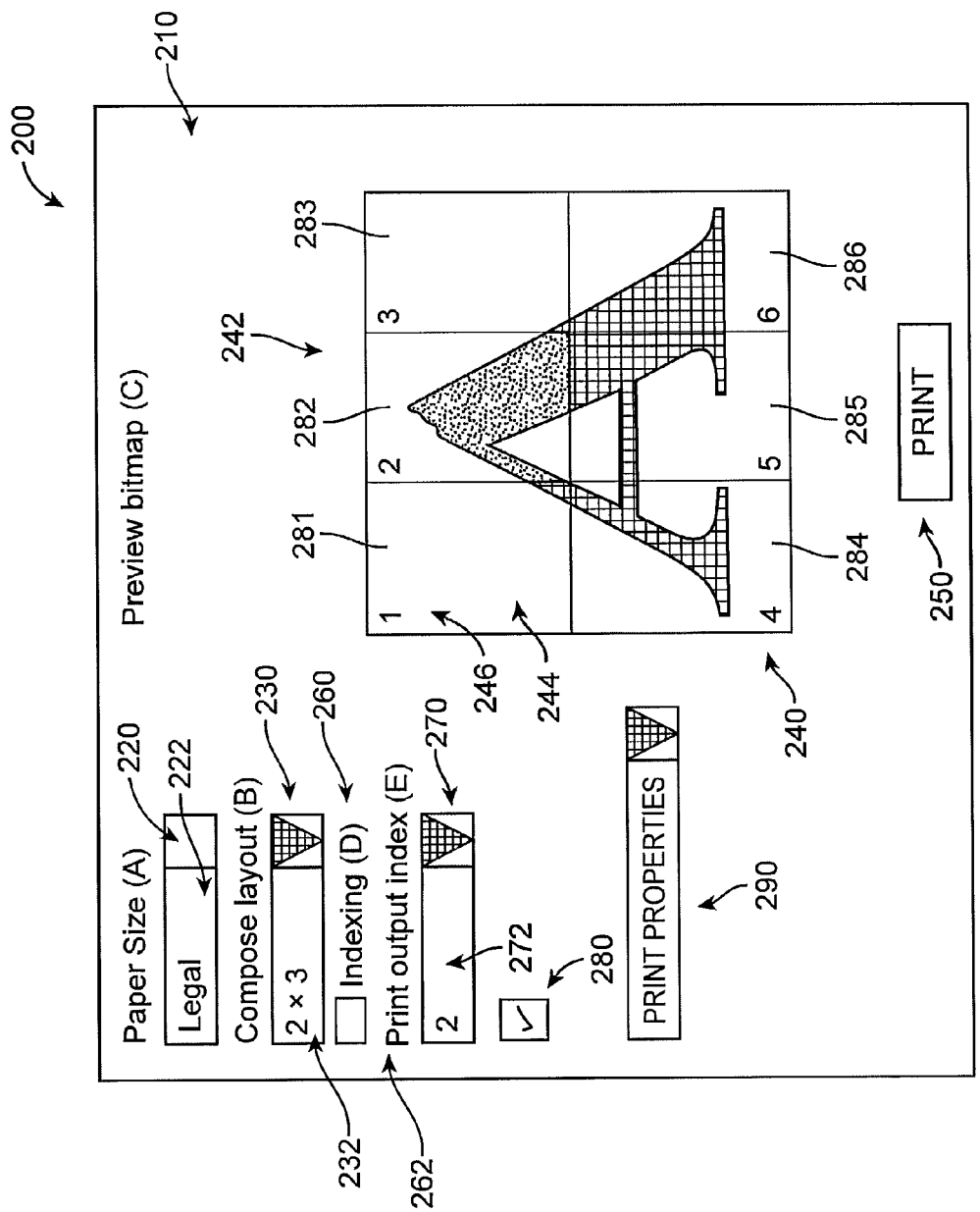
FIG. 2 is an illustration of a driver user interface associated with a client device or host computer in accordance with an embodiment.

FIG. 2 is an illustration of a printer driver user interface 200 associated with a client device or host computer 100 in accordance with an embodiment. As shown in FIG. 2, in accordance with an embodiment, the driver user interface 200 includes a graphical user interface (GUI) screen 210 having a paper size window 220, a compose layout window 230, a display (or display window) 240 in the form of a preview bitmap 242, and a print button 250. The graphical user interface (GUI) screen 210 enables a user to configure print settings for the image forming apparatus 120. The user interacts with the interface 210 to configure the printer driver, and thereby specify print settings for any print jobs sent from the client device 110 to the image forming apparatus 120. For example, the client device 110 may provide one or more graphical user interface (GUI) screens, which allows the user to specify print settings such as, paper type, paper source, pages to be printed, number of copies to print, print quality, print sizing/scaling, double-sided printing, N-up printing, collating, color printing, print order, and the like. Further, the user may set the print settings, at least in part, through interaction with graphical elements of the interface 200 (e.g., pushing buttons, selecting menu items, selecting radio buttons, clicking icons, checking boxes, etc.).

In accordance with an embodiment, the driver user interface screen 210 displays at least one paper size option 222 within the paper size window 220, a compose layout (or composition layout) 232 in form of matrix, which indicates how the image partitions or physical pages will print according to the size of the selected medium (or paper) and as displayed in the preview bitmap 242. The preview bitmap 242 preferably displays a plurality of rectangular partitions, which illustrate how the large print image or logical page is partitioned upon a selection of a particular paper size. The compose layout window 230 has a set of layouts 232 (or matrixes, such as 1×1, 1×2, 1×3, 2×1, 2×2, 2×3, 3×1, 3×2, and 3×3) using a roll down cursor window, or user option windows to enter custom number of rows and columns to be printed.

As shown in FIG. 2, the driver user interface 200 also includes an indexing window 260, a print output index window 270, a print property window 280, and a listing of print property window or tab 290. The index printing application provides the user the ability to selectively print individual sheets of the image (or poster). The indexing window 260 includes a check box 262, which controls the on/off function of the index printing. In accordance with an exemplary embodiment, the print output index window 270 includes a numeric script number (and/or symbol) 272, which corresponds to a numeric script number 246 on each of the physical pages (or partitions) 244 of the bitmap 242, and which is based on the layout matrix chosen in the compose layout window 230. The numeric script number (and/or symbol) 272 can be a numeric number, alphabetic letters, a combination thereof, or any other system in which the corresponding partitions 244 on the bitmap 242 can be identified.

The print property window 280 provides the user with the ability to selectively change at least one print property within one or more of the physical pages of the image. The listing of print property window 290 is preferably a pull down window or click-through tab, which provides a link to one or more available print properties, which relate to color and/or image quality of the printed image. In accordance with an embodiment, if a user wishes to change at least one print property, the user checks the print property window 280, and selects a physical page or partition 244 on the display and a corresponding print property via the listing of print property window or tab 290. Once the corresponding print property has been selected, the user can print the plurality of pages, which form the logical page or poster printout. In accordance with an alternative embodiment, the listing of print properties 290 can be a separate user interface screen, which is not associated with the selection of the compose layout window as shown in FIG. 2. For example, one or more separate user interface screens can be used to specify print settings such as, paper type, paper source, pages to be printed, number of copies to print, print quality, print sizing/scaling, N-up printing, color printing, print order, and the like.

In accordance with an exemplary embodiment, the paper size window 220, the compose layout window (or composition layout window) 230, the print button 250, indexing window 260, the print output index window 270, the print property window 280, and the listing of print property window or tab 290 are preferably controlled through the use of cursor via a mouse and/or keyboard. Alternatively, the paper size window 220, the compose layout window (or composition layout window) 230, the print button 250, the indexing window 260, the print output index window 270, the print property window 280, and the listing of print property window or tab 290 can be controlled via touch screen technology, which can detect the presence and location of a touch within the display area to change the paper size, change the layout of the image, select print properties, and to initiate and/or start the printing process.

In accordance with an embodiment, a positioning index can be printed on each sheet to assist in the assembling process. Sometimes it may be difficult for the user to determine which printed sheet should be placed at which position when assembling the poster. A small positioning index, such as a pair of column and row numbers, can be printed in the overprinted area of each sheet, such as near a corner, to help the user identify the sheet during assembly. The position index should be printed in an area that will either be torn off or in an area that will be covered by a neighboring sheet.

Figure 3:
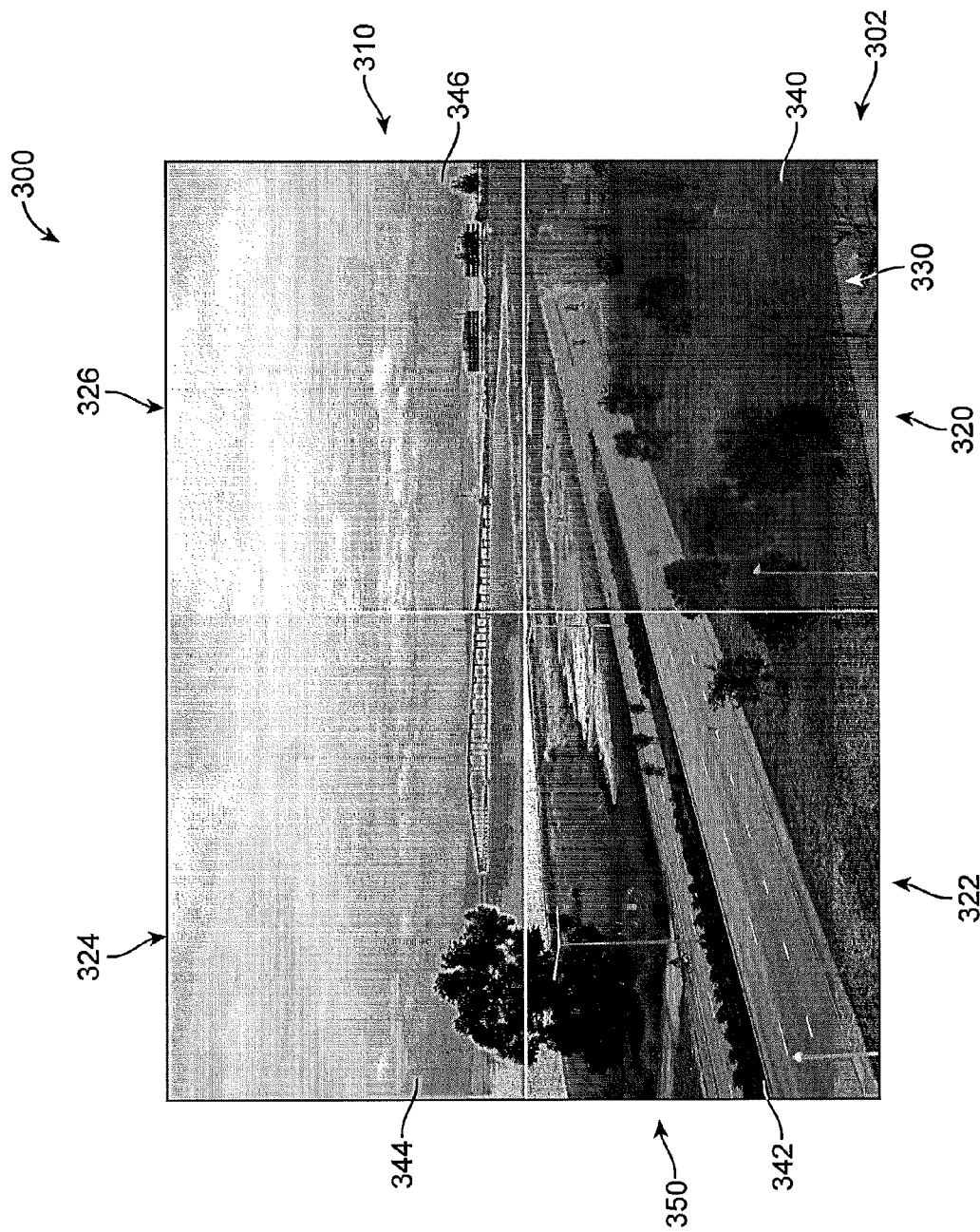
FIG. 3 is an illustration of a poster printing application where an individual physical page has different print properties than the other physical pages in the print job.

FIG. 3 is an illustration of a large format print or poster page 300 from a poster printing application where an individual physical page 320 has different print properties than the other physical pages 322, 324, 326 in the print job. The large format printout or poster page 300 of the print image 302 is formed from a logical page 310, which is created by manually joining several physical pages 320, 322, 324, 326 together to make one large format printout or poster page 300. Typically, a single page in an original document can be said to be one logical page 310. However, multiple physical pages 320, 322, 324, 326 can represent the single logical page 310 when the logical page 310 is printed in the large format or poster printing mode. In the large format or poster printing mode, each physical page 320, 322, 324, 326 is an actual physical sheet of paper (i.e., print medium) that is used to print a poster print job. As set forth above, posters 300 are generally printed on large format papers and require sophisticated, large printers to print. However, small printers, e.g., printers typically used in homes or business offices, are typically limited to letter, legal, A4 and A3 sizes papers and cannot handle larger sized papers. To enable printing of a large format poster using a small printer in an inexpensive manner, some printer drivers or application software provide a poster printing function, which divides the large poster image 330 into smaller image sections 340, 342, 344, 346, typically rectangular in shape.

In accordance with an exemplary embodiment, each of the image sections 340, 342, 344, 346 are printed separately on individual sheets of paper or print medium 320, 322, 324, 326, and assembled together to form a large format poster 300. For example, in a 2×2 poster printing application, the logical page 310 will have four (4) physical sheets 320, 322, 324, 326, which make up the one (1) logical page 310. In printing an image 330 in a poster printing application, as shown in FIG. 3, the user selects the logical page size 310 (or matrix) via the compose layout window 230 on the display and/or graphical user interface (GUI) screen 210. For example, a poster 300 sized at 17 by 22 inches can be made from four 8.5 by 11 pages (or sheets of print medium) 320,

322, 324, 326, which is a 2×2 application (or 2×2 matrix). In a poster printing application, the user is able to define the following settings: number of rows (X) and columns (Y), output paper size, and orientation (e.g., portrait or landscape). In addition, each physical page 320, 322, 324, 326 of the print job, which forms the logical page size 310, is printed with the same print properties 350.

In accordance with an exemplary embodiment, the executable instructions provide for the selection of a logical page size 310 for the printout of the image based on the selection of a composite matrix via the compose layout window 230 on the display and/or graphical user interface (GUI) screen 210. The logical page size 310 is then divided into a plurality of physical pages 320, 322, 324, 326 based on a selected medium. At least one physical page 320 from the plurality of physical pages 320, 322, 324, 326 is selected and at least one print property 350 is changed on the at least one physical page 320, which has been selected from the plurality of physical pages 320, 322, 324, 326. In accordance with an alternative embodiment, the logical page size 310 can be a 1×1 matrix, wherein the image is sized to fit on a single sheet of the medium, such that the logical page size 310 does not include a plurality of physical pages.

The step of dividing the logical page size into a plurality of physical pages comprises dividing the print image into a plurality of physical pages, which are in arranged in rows (X) and columns (Y). The selected medium has a sheet size, which can include letter (8.5 by 11 inches), legal (8.5 by 14 inches), A4 and A3 sizes papers, and/or any other desirable sheet size for the printed medium. The step of selecting the logical page size for the printout of the image further comprises selecting an orientation of the print image on the logical page size.

In accordance with an exemplary embodiment, the at least one print property on adjacent physical pages to the selected at least one physical page is also changed and/or adjusted to avoid a sudden change in image quality and/or image appearance of the image in the printout. The at least one print property 350 preferably relates to color and/or image quality of the print image. For example, the image quality can include brightness, edge effect, sharpening or hardening, smoothness, shadowing, shading and/or blurring of the background. Upon printing of the plurality of physical pages 320, 322, 324, 326, the at least one print property on at least one physical page selected from the plurality of physical pages is changed per the users request. In accordance with an exemplary embodiment, two or more print properties 350 can be changed on one or more of the physical pages as desired by the user.

As described, the print properties for neighboring or consecutive physical pages are affected and/or adjusted by the user's designation of a change in the print properties for a selected physical page within the one or more physical pages. By adjusting the print properties on neighboring or consecutive physical pages, the adjustment avoids sudden change in image quality or image appearance (color effects, sharpness, brightness and so on) between the specific physical page and the neighboring physical pages. For example, in case the user changes the brightness for a center physical page of a 5×5 poster print job to be +4 (0 being a default value), the brightness setting for the eight neighboring physical pages are changed to +2, while the brightness setting for the sixteen peripheral pages remain to be 0 (default).

In accordance with an alternative implementation, the brightness settings for the eight neighboring physical pages can be changed area by area. For example, in accordance with an exemplary embodiment, the areas closest to the specific physical page are given a +3, the center areas are given +2, and the areas apart from the specific page are given +1, so that the brightness can be gradually changed from a center portion of the print image or logical page size to a periphery of the printout.

In accordance with an exemplary embodiment, the step of selecting at least one physical page from the plurality of physical pages further comprises selecting only a portion of the at least one physical page and adjusting adjacent portions of the at least one physical page and the adjacent physical pages on an area by area basis. For example, an area closer to the selected portion of the at least one physical page preferably has a different application of the change in the at least one print property than an area that is further away from the selected portion of the at least one physical page. In addition, the different applications of the change in the at least one print property can extend from the selected portion to a periphery of the logical page size. Each of the selected at least one physical page(s) and/or areas are preferably selected using a mouse and keyboard and/or a touch screen.

Figure 4:
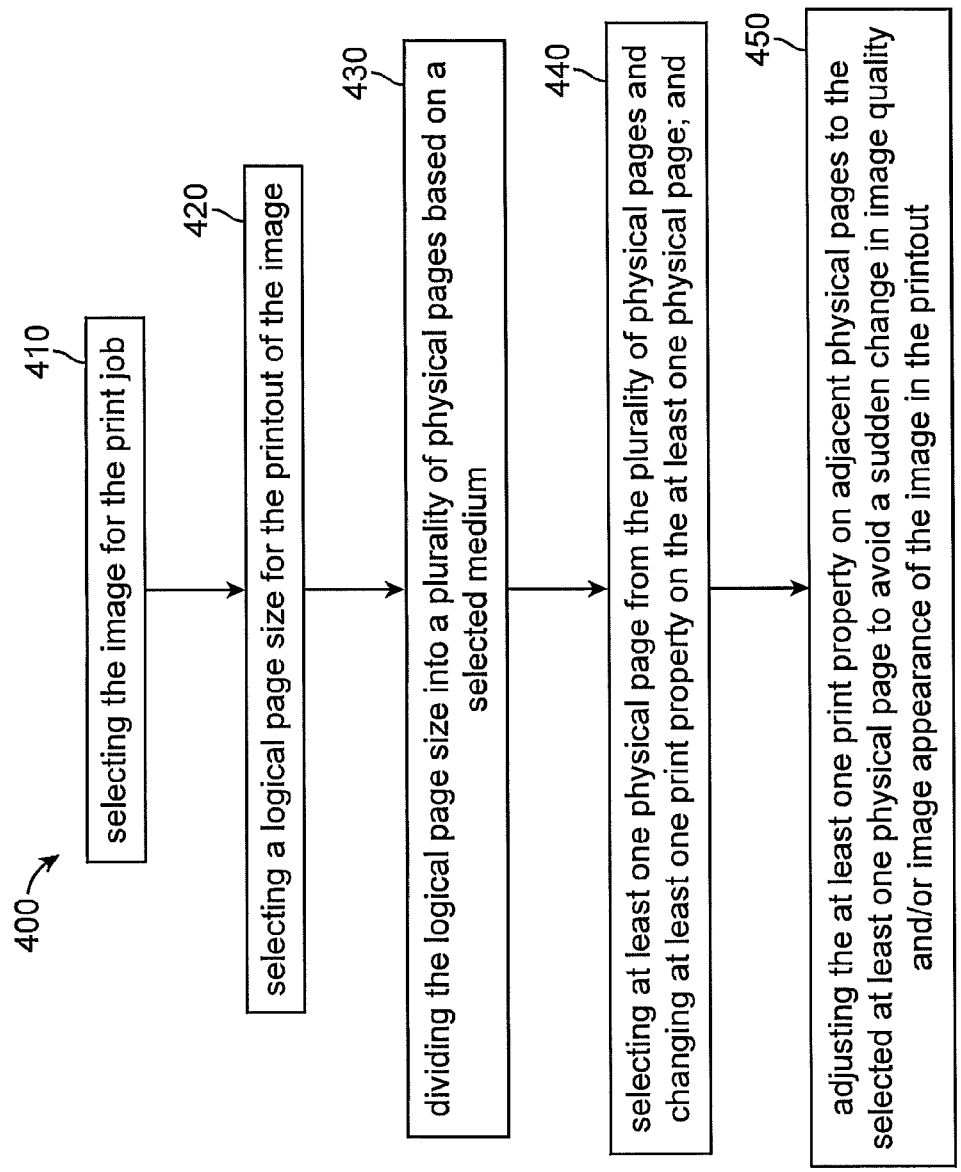
FIG. 4 is a flow chart illustrating a method for changing physical page properties in a poster printing application on an image forming apparatus in accordance with an exemplary embodiment.

FIG. 4 is a flow chart illustrating a method for changing physical page properties in a poster printing application on an image forming apparatus in accordance with an exemplary embodiment. As shown in FIG. 4, the method for changing physical page properties in a large format printing application on a client device, the client device having executable instructions 400 for creating a print job for producing a printout of an image. In step 410, the image for the print job is selected. In step 420, a logical page size for the printout of the image is selected. In step 430, the logical page size is divided into a plurality of physical pages based on a selected medium. In step 440, at least one physical page from the plurality of physical pages is selected and at least one print property on the at least one physical page is changed. In step 450, the at least one print property on adjacent physical pages to the selected at least one physical page is adjusted to avoid a sudden change in image quality and/or image appearance of the image in the printout.

Figure 5:
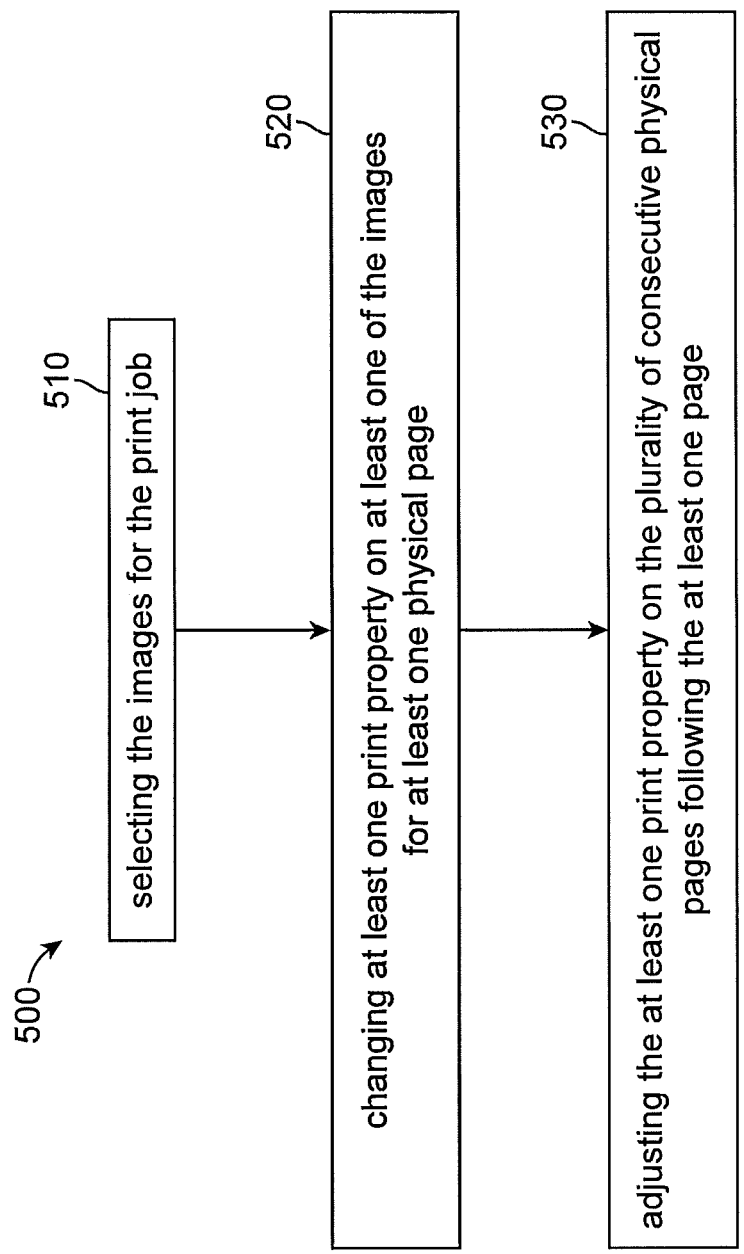
FIG. 5 is a flow chart illustrating another method for changing physical page properties for a plurality of consecutive physical pages in accordance with an exemplary embodiment.

FIG. 5 is a flow chart illustrating another method for changing physical page properties for a plurality of physical pages in accordance with an exemplary embodiment. As shown in FIG. 5, the method includes executable instructions 500 for creating a print job for producing a printout of images on a plurality of consecutive physical pages. In step 510, at least one image is selected for the print job. In step 520, at least one print property on the image is changed for at least one physical page. In step 530, the at least one print property is adjusted on the plurality of consecutive physical pages before and/or following the at least one physical page to avoid a sudden change in image quality and/or image appearance of the image in each of the plurality of consecutive physical pages. In accordance with an exemplary embodiment, in step 530, the at least one print property on the plurality of consecutive physical pages can be adjusted before the at least one physical page. In accordance with an exemplary embodiment, the plurality of consecutive physical pages forms a flip book. The flip book preferably includes a stack of consecutive sheets containing a series of images bound together along one edge and wherein each sheet contains an image with a small incremental movement and/or change in print properties over the image preceding it in the stack of consecutive sheets. For the case of a flip book, the first one of the series of the images can be selected in the step 510. Alternatively, the series of the images can be selected in the step 510.

The methods as described herein may be implemented by software as a part of a printer driver or a part of an application program that handles images. The invention is directed to both the method and an apparatus, such as an image forming apparatus (or printer) 120 or computer device (or host computer) 110, which implements the method by executing a program stored in a non-volatile memory, such as a read only memory (ROM). The method may be introduced into the image forming apparatus 120 or computer device 110 by updating the firmware in the non-volatile memory. In this regard, the method may be brought to the apparatus 120 or computer device 110 in a form of a package of install software and the firmware, which may be divided and/or compressed so that the install software effectively installs the firmware. The package may be steadily stored in a computer readable diskette, such as a compact disk, or may be transmitted through a wire/wireless communication line.

In accordance with another exemplary embodiment, a non-transitory computer readable medium containing a computer program for creating a print job, wherein the computer program comprises executable instructions for: selecting the image for the print job; selecting a logical page size for the printout of the image; dividing the logical page size into a plurality of physical pages based on a selected medium; selecting at least one physical page from the plurality of physical pages and changing at least one print property on the at least one physical page; and adjusting the at least one print property on adjacent physical pages to the selected at least one physical page to avoid a sudden change in image quality and/or image appearance of the image in the printout.

In accordance with another exemplary embodiment, a non-transitory computer readable medium containing a computer program for creating a print job, wherein the computer program comprises executable instructions for: selecting the image for the print job; changing at least one print property on the image for at least one physical page; and adjusting the at least one print property on the plurality of consecutive physical pages following the at least one page to avoid a sudden change in image quality and/or image appearance of the image in each of the plurality of consecutive physical pages.

The non-transitory computer usable medium, of course, may be a magnetic recording medium, a magneto-optic recording medium, or any other recording medium which will be developed in future, all of which can be considered applicable to the present invention in all the same way. Duplicates of such medium including primary and secondary duplicate products and others are considered equivalent to the above medium without doubt. Furthermore, even if an embodiment of the present invention is a combination of software and hardware, it does not deviate from the concept of the invention at all. The present invention may be implemented such that its software part has been written onto a recording medium in advance and will be read as required in operation.

It will be apparent to those skilled in the art that various modifications and variation can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for changing physical page properties in a large format printing application on a client device having a graphical user interface, the client device having executable instructions for creating a print job for producing a printout of an image, the method comprising:
   selecting the image for the print job;
   selecting a logical page size for the printout of the image;
   dividing the logical page size into a plurality of physical pages based on a selected medium;
   generating a bitmap of the plurality of physical pages based on the selected medium and displaying the bitmap of the plurality of physical pages on the graphical user interface;
   selecting at least one physical page from the bitmap of the plurality of physical pages using the graphical user interface and changing at least one print property on the at least one physical page, wherein the graphical user interface includes a selector for selecting the at least one physical page from the plurality of physical pages, and a print property change window for selectively changing the at least one print property on the at least one physical page; and
   adjusting the at least one print property on adjacent physical pages to the selected at least one physical page to avoid a sudden change in image quality and/or image appearance of the image in the printout, and wherein for each of the plurality of physical pages not selected or adjacent to the at least one selected physical page, the at least one print property does not change.

2. The method of claim 1, wherein the step of selecting at least one physical page from the plurality of physical pages further comprises:
   selecting only a portion of the at least one physical page and adjusting adjacent portions of the at least one physical page and the adjacent physical pages on an area by area basis.

3. The method of claim 2, wherein an area closer to the selected portion of the at least one physical page has a different application of the change in the at least one print property than an area that is further away from the selected portion of the at least one physical page.

4. The method of claim 3, wherein the different applications of the change in the at least one print property extends from the selected portion to a periphery of the logical page size.

5. The method of claim 1, wherein the client device is connected to an image forming apparatus, and wherein the client device has executable instructions for creating the print job, and sending the print job to the image forming apparatus.

6. The method of claim 1, comprising:
   printing the plurality of physical pages; and
   assembling the plurality of physical pages into a poster page.

7. The method of claim 1, wherein the step of dividing the logical page size into a plurality of physical pages comprises:
   dividing the print image into a plurality of physical pages, which are in arranged in rows and columns.

8. The method of claim 1, wherein the at least one print property is color and/or image quality.

9. A printing system for changing physical page properties in a large format printing application, comprising:
   an image forming apparatus;
   a client device having a graphical user interface, the client device having executable instructions for creating a print job for producing a printout of an image, comprising:
   selecting an image for a print job;
   selecting the image for the print job;
   selecting a logical page size for the printout of the image;
   dividing the logical page size into a plurality of physical pages based on a selected medium;
   generating a bitmap of the plurality of physical pages based on the selected medium and displaying the bitmap of the plurality of physical pages on the graphical user interface;
   selecting at least one physical page from the bitmap of the plurality of physical pages using the graphical user interface and changing at least one print property on the at least one physical page, wherein the graphical user interface includes a selector for selecting the at least one physical page from the plurality of physical pages, and a print property change window for selectively changing the at least one print property on the at least one physical page; and adjusting the at least one print property on adjacent physical pages to the selected at least one physical page to avoid a sudden change in image quality and/or image appearance of the image in the printout, and wherein for each of the plurality of physical pages not selected or adjacent to the at least one selected physical page, the at least one print property does not change; and wherein the image forming apparatus and the client device are connected.

10. The system of claim 9, wherein the step of selecting at least one physical page from the plurality of physical pages further comprises:

selecting only a portion of the at least one physical page and adjusting adjacent portions of the at least one physical page and the adjacent physical pages on an area by area basis.

11. The system of claim 10, wherein an area closer to the selected portion of the at least one physical page has a different application of the change in the at least one print property than an area that is further away from the selected portion of the at least one physical page.

12. The system of claim 11, wherein the different applications of the change in the at least one print property extends from the selected portion to a periphery of the logical page size.

13. The system of claim 9, comprising: assembling the plurality of physical pages into a poster page.

14. The system of claim 9, wherein the step of dividing the logical page size into a plurality of physical pages comprises:

dividing the print image into a plurality of physical pages, which are in arranged in rows and columns.

15. The system of claim 9, wherein the at least one print property is color and/or image quality.

16. A non-transitory computer readable medium containing a computer program for creating a print job, wherein the computer program comprises executable instructions for:

selecting the image for the print job;
selecting a logical page size for the printout of the image;
dividing the logical page size into a plurality of physical pages based on a selected medium;
generating a bitmap of the plurality of physical pages based on the selected medium and displaying the bitmap of the plurality of physical pages on a graphical user interface;
selecting at least one physical page from the bitmap of the plurality of physical pages using the graphical user interface and changing at least one print property on the at least one physical page, wherein the graphical user interface includes a selector for selecting the at least one physical page from the plurality of physical pages, and a print property change window for selectively changing the at least one print property on the at least one physical page; and
adjusting the at least one print property on adjacent physical pages to the selected at least one physical page to avoid a sudden change in image quality and/or image appearance of the image in the printout, and wherein for each of the plurality of physical pages not selected or adjacent to the at least one selected physical page, the at least one print property does not change.

17. The computer readable medium of claim 16, wherein the step of selecting at least one physical page from the plurality of physical pages further comprises:

selecting only a portion of the at least one physical page and adjusting adjacent portions of the at least one physical page and the adjacent physical pages on an area by area basis.

18. The computer readable medium of claim 17, wherein an area closer to the selected portion of the at least one physical page has a different application of the change in the at least one print property than an area that is further away from the selected portion of the at least one physical page.

19. The computer readable medium of claim 18, wherein the different applications of the change in the at least one print property extends from the selected portion to a periphery of the logical page size.

* * * * *